United States Patent [19]

Gardou

[11] 4,235,467
[45] Nov. 25, 1980

[54] BUMPER STRUCTURES, PARTICULARLY FOR VEHICLES

[75] Inventor: Guy R. M. Gardou, Orsay, France

[73] Assignees: Societe Anonyme Automobiles Citroen; Automobiles Peugeot, both of Paris, France

[21] Appl. No.: 7,245

[22] Filed: Jan. 29, 1979

[30] Foreign Application Priority Data

Feb. 6, 1978 [FR] France ................................ 78 03265

[51] Int. Cl.² ............................................ B60R 19/08
[52] U.S. Cl. .................................... 293/135; 267/148; 267/158; 293/138
[58] Field of Search ................ 293/135, 138, 141, 102, 293/120, 130, 132; 267/148, 158, 47, 45

[56] References Cited

U.S. PATENT DOCUMENTS

| | | | |
|---|---|---|---|
| 1,497,748 | 6/1924 | Appleby | 293/130 |
| 1,812,417 | 6/1931 | Thomas | 293/138 |
| 1,855,977 | 4/1932 | Llobet | 293/135 |
| 2,049,210 | 7/1936 | Lindauer | 293/135 |
| 2,059,000 | 10/1936 | LaClair | 293/135 |
| 3,173,668 | 3/1965 | Giovinazzo | 267/45 |
| 4,061,384 | 12/1977 | Montgomery et al. | 293/120 |

*Primary Examiner*—John J. Love
*Assistant Examiner*—Ross Weaver
*Attorney, Agent, or Firm*—Stevens, Davis, Miller & Mosher

[57] ABSTRACT

A bumper structure comprising at least two flexure elements extending transversely between two abutment zones situated at their ends.

The two flexure elements are connected together at their middle part; the moment of inertia of a first element, in the longitudinal direction L, is minimal in the middle part and increases on each side up to a maximum value for a section S, then decreases as far as the ends 2e; the second element presents, in its middle part, the section having the maximum moment of inertia, the moment of inertia of the sections of this second element decreasing on each side as far as the ends.

11 Claims, 3 Drawing Figures

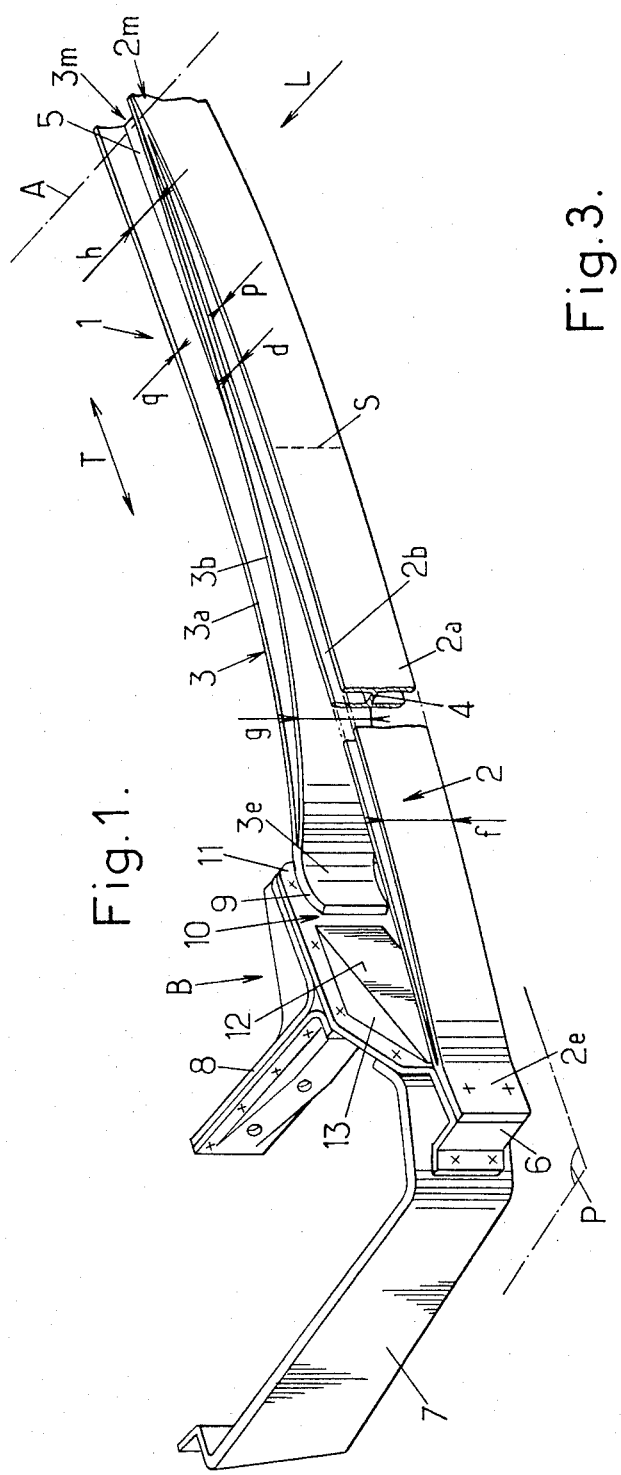
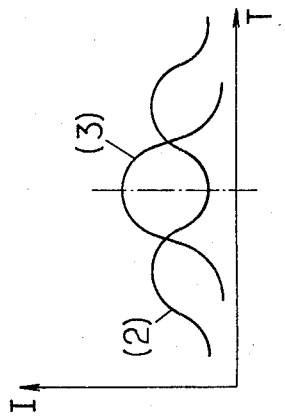
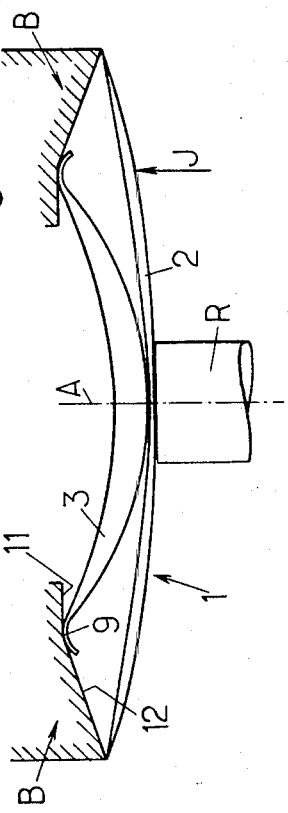

BUMPER STRUCTURES, PARTICULARLY FOR VEHICLES

The invention relates to bumper structures, particularly for vehicles, of the kind which comprises at least two flexure elements extending, transversely, between two abutment zones situated towards the ends thereof, these elements being intended, by flexing, to absorb at least partially the energy of a shock having a longitudinal component.

The invention aims especially at making these bumper structures such that they answer better than heretofore the different requirements of practice and particularly such that they allow a regulated absorption of shocks to be obtained, with balanced movements of the structure, whatever the point of application of the impact and its orientation.

According to the invention, a bumper structure of the kind defined above is characterized by the fact that the two flexure elements are rigidly connected to each other in their middle part and that, on the one hand, the moment of inertia of a first flexure element, along the longitudinal direction, is minimal in the middle part of this element and increases, on both sides, up to a maximum value for a section situated between the middle part and the ends of this first element then diminishes up to the sections situated at the ends of the first element, and that, on the other hand, the second element presents, in its middle part, the section having the maximum moment of inertia in the longitudinal direction, the moment of inertia of the sections of this second element decreasing, on both sides of the middle part, up to the ends of the second element.

Generally, the two elements are situated one behind the other in the longitudinal direction and the first element is situated outwardly in relation to the second so as to receive the shock first.

Advantageously, each element forms a beam with lateral flanges substantially orthogonal to said longitudinal direction, i.e. to the orientation anticipated for the stresses, these flanges presenting a variable spacing and being connected by a web, substantially perpendicular to the flanges: the height of this web, for the first element, is minimal in the middle part, as well as at the ends of the first element and passes through two maximum values located on each side of the middle part; the web of the second element has a maximum height in the middle part of this element, and this height decreases, on each side, up to the ends of this second element.

Advantageously, the flanges of the elements have constant width and thickness.

The section of each element, through a plane perpendicular to its mean line, is preferably H-shaped, with a web situated in the median plane of the width of the flanges.

The minimum height of the web, for each element, is advantageously a zero height corresponding to the contacting of the inner faces of the two flanges of the element.

In the case where the first element is situated outwardly in relation to the second, the flange of the first element adjacent the second element and the flange of the second element adjacent the first element are advantageously rigidly locked together in the middle part of the structure.

The ends of the first element are fixed to the bodywork.

A simple sliding support can be provided for the ends of the second element, against stops integral with the bodywork. These stops may comprise a surface perpendicular to the longitudinal direction and extended transversely by a sloping area with its slope directed towards the first element.

The bumper structure is advantageously constructed from carbon fibers.

The invention consists, apart from the arrangements outlined above, of certain other arrangements which will be more explicitly discussed hereafter in connection with a particular embodiment described with reference to the accompanying drawing, but which is in no wise limitative.

FIG. 1 of this drawing is a perspective view, with parts cut away, of a bumper structure in accordance with the invention.

FIG. 2 is a schematical illustration of this structure.

FIG. 3 finally is a graph showing the trend of the variations of the moment of inertia, in the longitudinal direction, of the sections of the elements.

Referring to FIG. 1 of the drawings, there can be seen a bumper structure 1 which comprises at least two transversely extending flexure elements 2,3, i.e. parallel to transverse direction T, between two abutment zones located at the ends of said elements. In the drawing, there is shown only one abutment zone B and only a half of each of elements 2 and 3.

The section of elements 2 and 3 through a plane perpendicular to direction T allows a mean plane P parallel to direction T and passing through the abutment zones.

Elements 2 and 3 are intended to work by flexing so as to absorb, at least partially, the energy of a shock having a longitudinal component, i.e. a component turned in direction L. This direction L is perpendicular to transverse direction T and parallel to plane P.

Generally, the bumper structure 1 is intended for a motor vehicle and plane P is horizontal; direction L is parallel to the longitudinal axis of the vehicle, shown by A in FIG. 1. Structure 1 is symmetrical in relation to the vertical plane passing through A.

The two flexure elements 2 and 3 are rigidly connected together at their middle parts 2m, 3m, situated half-way between the ends of elements 2 and 3.

The moment of inertia of the first flexure element 2, for stresses applied in longitudinal direction L, is minimum in the middle part 2m, and increases on each side of this middle part up to a maximum value for two sections, such as S, located between the middle part 2m and the ends of this element 2. In FIG. 1, only one section S can be seen since only one half of element 2 has been shown. The second section S, situated on the other side of axis A, is symmetrical to the first in relation to the plane passing through A and perpendicular to direction T.

In FIG. 3, there is shown, as ordinates, the moments of inertia I of the sections, for stresses applied in direction L, and as abscissa, the position of the sections along direction T.

The curve (2) gives the trend of the variations of the moment of inertia of the sections of element 2.

The second element 3 presents, in its middle part 3m, the section with maximum moment of inertia along direction L. The moment of inertia of the sections of this second element 3 decreases on each side of the middle part up to the ends such as 3e of this second element.

In FIG. 3, the curve (3) gives the trend of the variations of the moment of inertia of the sections of element 3.

The elements 2 and 3 are situated one behind the other in direction L.

The first element 2 is generally situated outwardly in relation to the second element 3, so as to receive the shock first. Thus, when it is a question of a bumper situated in front of a vehicle, the first element 2 is situated in front of element 3, whereas for a rear bumper, element 2 is situated to the rear of element 3.

Each element 2 and 3 forms a beam with lateral flanges (2a,2b; 3a,3b) orthogonal to the longitudinal direction L, i.e. to the anticipated direction for the stresses exerted on the elements. These flanges, in the case of a vehicle bumper, are vertical. The flanges (2a,2b; 3a,3b) present a variable spacing respectively d and h and are connected by a web respectively 4,5, perpendicular to the flanges, i.e. situated generally in a horizontal plane.

The height of web 4 is equal to spacing d between the inner faces of flanges 2a,2b, whereas the height of web 5 is equal to the distance h between the inner faces of flanges 3a,3b.

The height d of web 4 for the first element 2 is minimal in the middle part 2m, as well as at the ends such as 2e of this element and passes through two maximum values corresponding to the sections such as S.

The height h of web 5 of the second element is maximal in the middle part 3m and decreases as far as the ends such as 3e.

As can be seen in FIG. 1, the section of each element 2 and 3, through a plane perpendicular to its mean line, has the shape of an H; the web 4 or 5 is situated in the median plane of the width f and g of the flanges of elements 2 and 3.

These widths f and g are advantageously constant, as well as the thickness p and q of the flanges.

The minimum value for the height d of web 4 is, preferably, the zero value reached in the middle part 2m and at the ends such as 2e. Similarly, for height h of web 5, the minimum value is the zero value at the level of the ends 3e.

When element 2 is situated, as shown in FIG. 1, outwardly in relation to element 3, the flanges 2b,3b of these elements, adjacent one another, are rigidly locked together at their middle part 2m,3m. This rigid locking together may be achieved by any appropriate means such as welding, or bolt securing means or any other fixing means.

The ends such as 2e of the first element 2 are fixed by any appropriate means (welding, bolts, etc.) to the structure of the bodywork.

In the diagram of FIG. 1, end 2e is fixed to an abutment 6 rigidly connected to the structure of the bodywork by a connecting frame 7, situated transversely towards the outside, and by a bracket 8, situated transversely towards the inside. This bracket 8 is fixed to the end of the chassis, for example at the end of a side member of the chassis.

The ends such as 3e of the second element 3 are given the shape of a sliding shoe 9 formed by a cylindrical part with vertical generatrices, and with its convexity turned towards the abutment, i.e. on the side opposite element 2. The abutment zone or face 10 is formed by the inner part, in the transverse direction, of abutment 6. The zone 10 is supported in direction L by bracket 8. This zone 10 presents a surface 11 perpendicular to direction L. In the absence of stress exerted on structure 1, shoe 9 bears against this surface 11.

This surface 11 is extended, transversely towards the outside, by a sloping area 12 with its slope turned towards element 2; that is to say that surface 12 draws closer to element 2 the further we move away from axis A in the transverse direction. This surface 12 may be formed by the outer surface of a block 13 solidly fixed to abutment 6. The shoe 9 bears against this surface 12 when a stress is exerted in direction L to cause a sufficient bending deformation of element 3.

According to a variation, end 3e could be rigidly fixed to bracket 8.

According to another possibility, end 3e could be spaced from abutment surface 11, in longitudinal direction L, in the absence of stress exerted on structure 1; the end 3e would come into contact with the surface only when a sufficient stress is exerted.

Elements 2 and 3 of the bumper structure are advantageously formed from carbon fibers, for the geometry and the function of this structure are particularly well adapted to the possibilities of this material; the low density of this material guarantees a substantial saving in weight.

The cumbersomeness of the structure is reduced.

It is clear that this bumper structure is generally covered by a coating, for example a deformable material particularly a plastic material, for decorative purposes.

The behaviour of the bumper structure, during an impact, follows directly from the preceding explanations. This behaviour is schematically shown in FIG. 2 where there can be seen illustrated in simplified form structure 1 and abutment zones B. In the case of a centered shock applied to the middle part of the structure by an object R, elements 2 and 3 are deformed by bending while bearing against abutments B and by absorbing, by their deformation, the shock. The stiffness, when bending, of element 3 increases when shoes 9 come into contact with the sloping ramps 12.

If the shock is offset transversely in relation to the longitudinal axis A and is exerted, for example, in the direction of arrow J, substantially at right angles to an abutment, the behaviour and the deformation of the structure 1 will be substantially the same as if this shock had taken place in the middle part, owing to the arrangement in accordance with the invention of the structure of the bumper.

This structure ensures a high kinetic energy absorption capacity for an impact at any place whatsoever without for all that causing a substantial axial movement which is likely to stave in the bodywork.

The axial compactness (i.e. in direction L) of this structure and the low value of its deflection confer thereon the advantage of easy and discreet housing, without appreciable repercussion on the longitudinal dimensions as a whole.

I claim:

1. A bumper structure comprising at least two flexure elements extending transversely between two abutment zones situated at their ends, these elements being intended, by their bending, to absorb at least partially the energy of a shock having a longitudinal component, characterized by the fact that the two flexure elements are rigidly connected to each other in their middle part and that, on the one hand, the moment of inertia of the first flexure element, in the longitudinal direction, is minimal in the middle part of this element and increases, on both sides, up to a maximum value for a section situated between the middle part and the ends of this first element then decreases as far as the sections situated at the ends of the first element, and that, on the other hand, the second element presents, in its middle part, the section having the maximum moment of inertia in the longitudinal direction, the moment of inertia of the sections of this second element decreasing, on both sides of the middle part, up to the ends of the second element.

2. A bumper structure according to claim 1, characterized by the fact that the two elements are situated one behind the other in the longitudinal direction and that the first element is situated, in relation to the second, towards the outside so as to receive the shock first.

3. A bumper structure according to claim 1, characterized by the fact that each element forms a beam with lateral flanges substantially orthogonal to said longitudinal direction, these flanges presenting a variable spacing and being connected by a web, substantially perpendicular to the flanges, the height of this web, for the first element, being minimal in the middle part, as well as at the ends of the first element and passing through two maximum values situated on each side of this middle part, the web of the second element having a maximum height in the middle part of this element, and this height decreasing, on each side, as far as the ends of this second element.

4. A bumper structure according to claim 3, characterized by the fact the flanges of the elements have constant width and thickness.

5. A bumper structure according to claim 3, characterized by the fact that the section of each element, through a plane perpendicular to its mean line, has the shape of an H with a web situated in the median plane of the width of the flanges.

6. A bumper structure according to claim 3, characterized by the fact that the minimum height of the web for each element is a zero height corresponding to the inner faces of the two flanges of the element coming into contact.

7. A bumper structure according to claim 2, characterized by the fact that the flange of the first element adjacent the second element and the flange of the second element adjacent the first element are rigidly locked together in the middle part of the structure.

8. A bumper structure according to claim 1, characterized by the fact that the ends of the first element are fixed to the bodywork.

9. A bumper structure according to claim 1, characterized by the fact that a simple sliding support is provided, for the ends of the second element, against an abutment integral with the bodywork.

10. A bumper structure according to claim 9, characterized by the fact the abutment, for the sliding support of one end of the second element, comprises a surface perpendicular to the longitudinal direction and extended transversely by a sloping area having its slope turned towards the first element.

11. A bumper structure according to claim 1, characterized by the fact that the flexure elements are made from carbon fibers.

* * * * *